Jan. 31, 1950     W. C. SEIFERT     2,495,778
DEVICE, METHOD, AND APPARATUS FOR THE DETERMINATION
OF EXPOSURE TIMES BY ALTERNATE OPAQUE AND
LIGHT-TRANSMITTING BANDS
Filed May 16, 1946     3 Sheets-Sheet 1

INVENTOR.
William Seifert
BY
Louis Burgess
Attorney

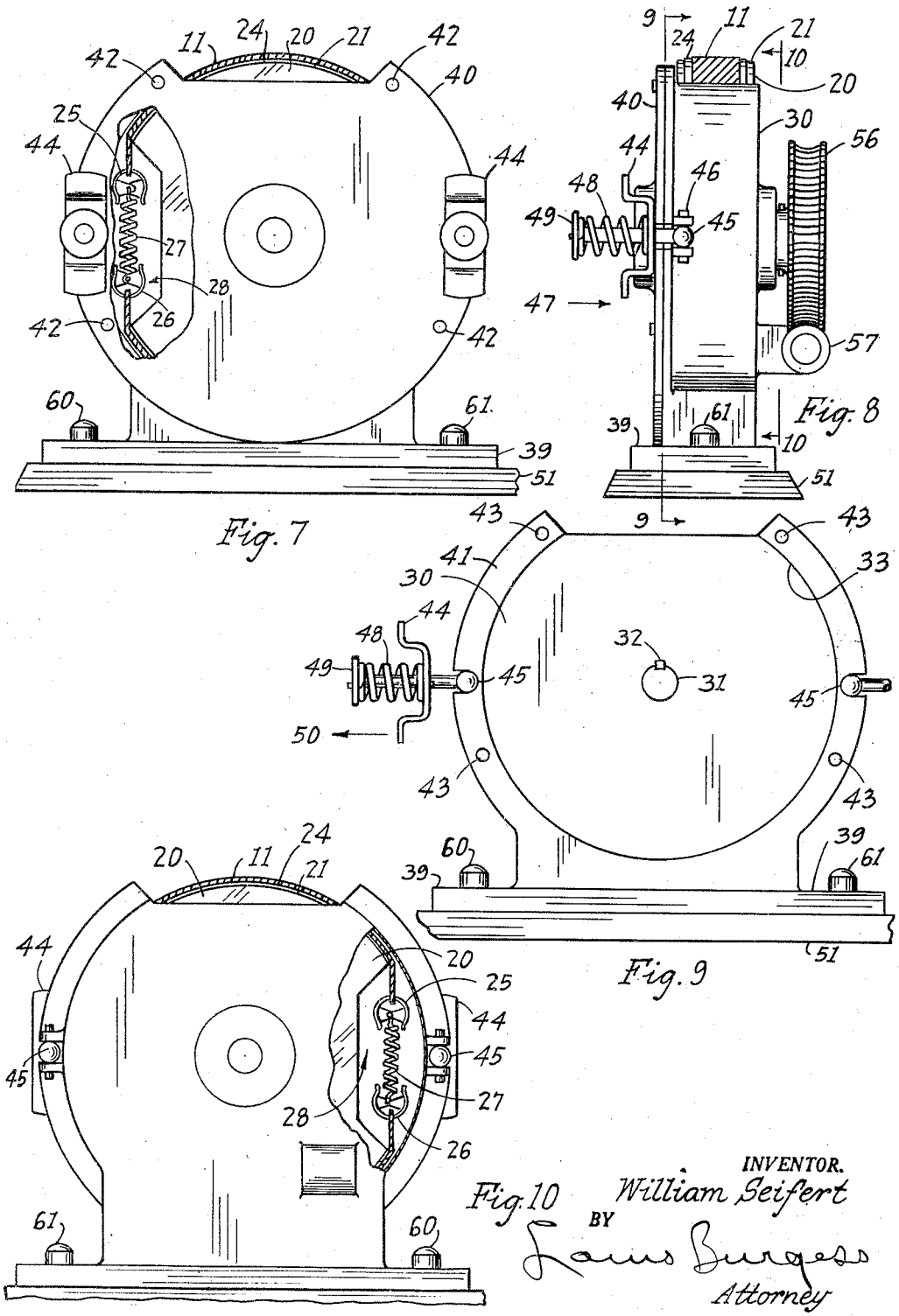

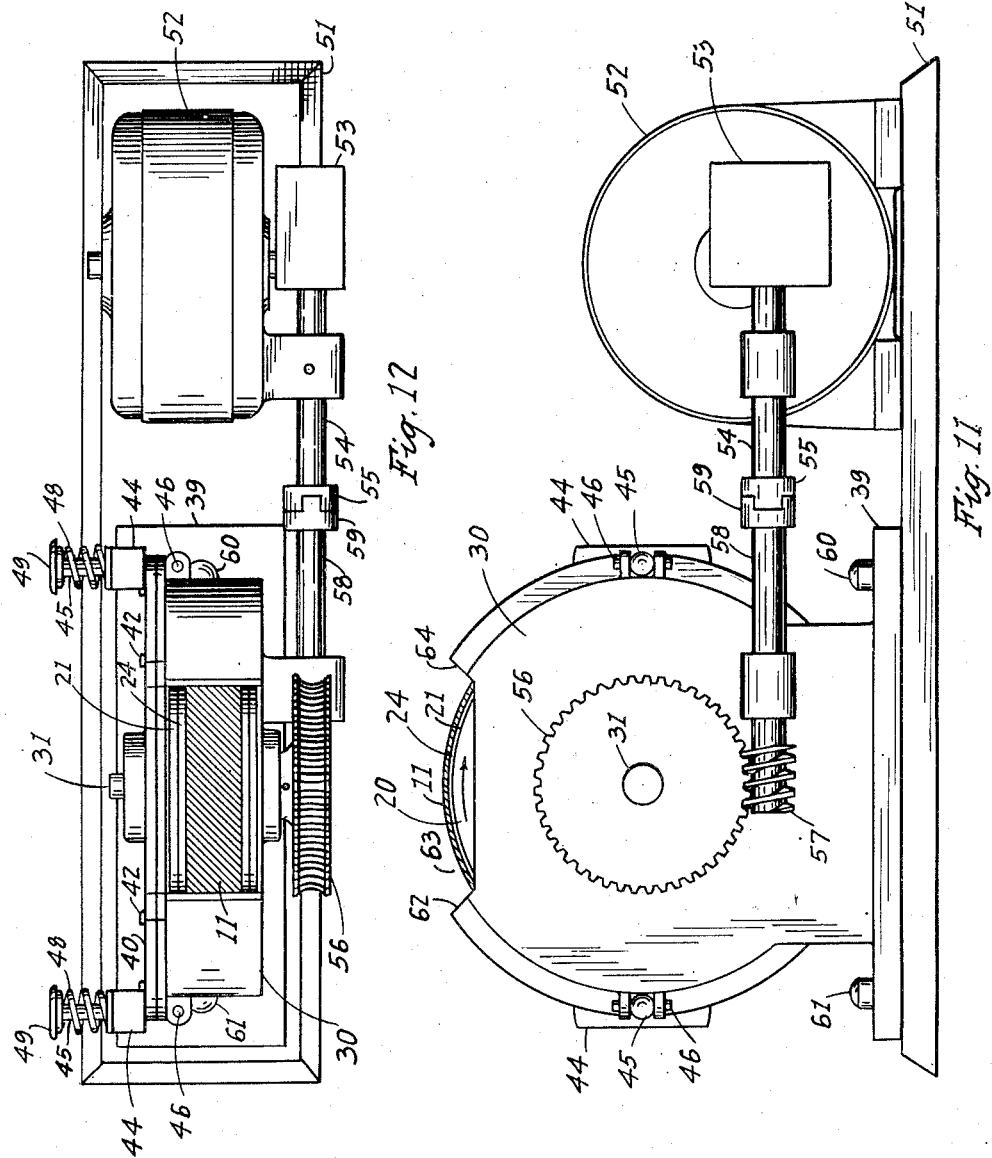

Patented Jan. 31, 1950

2,495,778

UNITED STATES PATENT OFFICE 2,495,778

DEVICE, METHOD, AND APPARATUS FOR THE DETERMINATION OF EXPOSURE TIMES BY ALTERNATE OPAQUE AND LIGHT-TRANSMITTING BANDS

William C. Seifert, Narbeth, Pa., assignor of one-half to Donald W. Kent, Whitemarsh, Pa.

Application May 16, 1946, Serial No. 670,159

7 Claims. (Cl. 95—10)

This invention is a new and useful improvement in devices, methods and apparatuses for the determination of exposure times and is principally applicable to photographic reproduction operations such as printing and enlarging.

In the photographic operation of printing, for example, a negative is superimposed upon a photographic paper and exposed to the action of light for a predetermined time which transfers to the photographic paper an inchoate reproduction in reverse of the image shown on the plate. This inchoate image is then converted into the desired photographic print by the conventional operations of developing and fixing. Unless previously found by experience it is necessary to ascertain by trial and error the correct exposure time for any particular photographic paper under identical light conditions. This involves a waste of time and materials.

The primary object of my invention is to make possible the ascertainment of the optimum exposure time speedily and economically in a single operation.

The invention will be fully understood from the following description read in conjunction with the drawings in which:

Fig. 7 is a side view of a part of one embodiment of the apparatus of my invention;

Fig. 8 is an end view of the construction shown in Fig. 7;

Fig. 9 is a view of the construction shown in Fig. 8 on the plane indicated by 9—9;

Fig. 10 is a view of the construction shown in Fig. 8 on the plane indicated by 10—10;

Fig. 11 is a side view of one embodiment of the complete apparatus of my invention, and Fig. 12 is a top view of the construction shown in Fig. 11.

Figure 1:
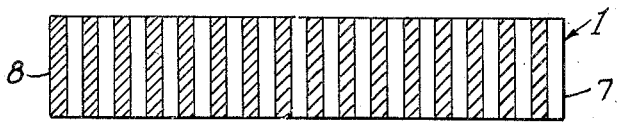
Fig. 1 is a top view of one form of the device of my invention.
Figure 2:
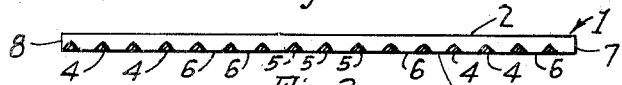
Fig. 2 is a side view of the construction shown in Fig. 1.

Referring to Figs. 1 and 2, 1 designates a relatively thin piece of transparent material bounded by the relatively smooth plane surfaces 2 and 3. It may, for example, be formed of a relatively thin sheet of transparent plastic but is preferably of glass, the surfaces 2 and 3 of which have been optically polished. In surface 3 of glass 1, I form a number of relatively narrow parallel grooves 4. These grooves are formed with relatively sharp edges and the preferred method of forming the same is by the use of a diamond point in a machine of the type used to make diffraction gratings. (As will be hereinafter explained, it is also advisable that the width of the grooves so formed be exactly equal to the width of the uncut surfaces of the glass between each contiguous pair of grooves.) After the grooves have been cut in surface 3 of glass 1 they are filled with a material capable of forming or being converted into a substance which can be set or othewise permanently anchored in the grooves to form a solid substance opaque to light. The glass containing this substance is then baked or otherwise treated to set the substance to a hard enamel and after this operation surface 3 is again finished by optical grinding and polishing to develop a smooth surface containing opaque bands 5 and therebetween transparent bands 6.

In practice bands 5 are not over ⅛ of an inch in width in the plane in which they are flush with surface 3 of glass 1 and in the preferred embodiment of my invention they are not over 1/64 of an inch in width.

In one relatively simple method for the practice of my invention I take a piece of the photographic paper for which the exposure time is to be determined and cut therefrom a small strip on the approximate outline shown in Fig. 1. The sensitive surface of this paper is then placed in contact with surface 3 of device 1. These operations are of course conducted in the absence of light which would affect the sensitive surface. While holding the sensitive surface snugly in contact with surface 3 of device 1 and carefully shielding the device from light it is brought into range of the same light source to be used in the actual printing of the photographic paper and in the same spatial relationship to this light source in which the actual printing operations are to be conducted, with surface 2 facing the light source and the shield covering this surface. When this has been done, the shield overlaying surface 2 is gradually withdrawn so that surface 2 is progressively exposed to the action of the light starting, for example, at end 7. This withdrawal is preferably conducted over a time interval equal to the maximum time which could possibly be required in the actual printing operation and as soon as end 8 has been uncovered the light source is cut off or surface 2 is immediately and fully covered. It will be evident that by this operation the end 7 of surface 2 which was initially uncovered will have been exposed to the light source for the full time occupied in the withdrawal while end 8 of surface 2 which was finally uncovered will have been exposed for an infinitesimal time while the intermediate portions of surface 2 will have been exposed for all possible intermediate times. The strip of photographic paper is then immediately fixed and dried after which it is carefully examined.

It would ordinarily be assumed that on such examination it would be found that the width of the exposed and now darkened bands in the photographic paper which were overlain by the transparent bands 6 in surface 3 would be equal in width to the transparent bands 6 and that the progressive difference in the paper with increasing time of exposure would be merely that of progressive darkening in the exposed areas. I have discovered that this is not so but that in the areas which were exposed for relatively short periods of time the absolute width of the darkened bands in the photographic paper will be less than the absolute width of the transparent bands 6 in surface 3 while in the areas which were overexposed the absolute width of these bands will be relatively greater than the transparent bands 6 and will extend over into the area which was overlain by opaque bands 5.

By noting this particular effect and ascertaining that part of the photographic paper in which the darkened bands are equal in absolute width to the width of the transparent bands 6 and knowing or calculating the absolute exposure time for each part of surface 2 of device 1 the observer may immediately conclude that this part of the device was exposed for the optimum time and may employ this time in subsequent printing operations.

The actual ascertainment of this fact is best carried out by the use of a microscope at about 50 diameters' magnification, preferably equipped with a self contained scale by which the absolute width of the darkened bands may be distinctly observed. Apart from the inherent difficulties of observation the method could be employed using opaque and transparent areas in surface 3 of device 1 regardless of their arrangement or configuration, provided the absolute dimensions of these areas had been fully ascertained in advance, and the edges of these areas were sharply defined. Both the sharpness of the edges and the ease of observation are augmented by forming these opaque and transparent areas in parallel bands as indicated in Fig. 1. I find it further of definite advantage to have the absolute width of opaque bands 5 identical with the absolute width of the transparent bands 6. In this case in examining the test paper in the microscope it is only necessary to ascertain the exact point in the length of the paper at which the white (unexposed) bands and the dark (exposed) bands are identical in width. The time at which this particular part of the paper has been exposed may be immediately assumed to be the optimum for use in the actual printing operation.

If for any reason it is impossible in carrying out the test to expose surface 2 progressively in the same spatial relationship to the light source in which the actual printing operations are to be conducted it is still possible by working on a photographic paper for which the optimum printing time is already known and determining the optimum time under the testing conditions to obtain a coefficient by which the optimum times shown in future tests may be multiplied to obtain the optimum times for use in the actual printing operation.

Figure 3:
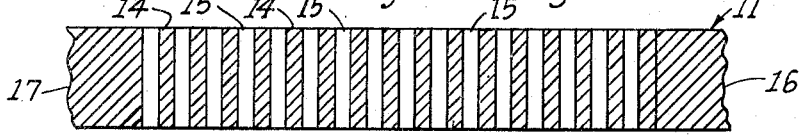
Fig. 3 is a top view of an alternative embodiment of the device of my invention.
Figure 4:
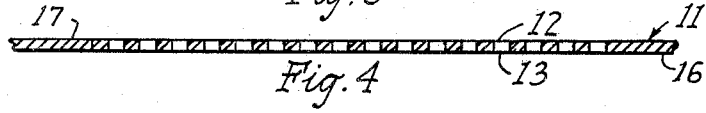
Fig. 4 is a side view of the construction shown in Fig. 3.

As will be evident from the foregoing description device 1 entails considerable skill and difficulty in its preparation and for this reason I prefer to manufacture for sale a more simple but notwithstanding highly efficient form of the device. For this purpose device 1 is placed firmly in contact with a strip of photographic film which is then uniformly exposed to a particular light source for the optimum exposure time. The film is then fixed and developed in the usual way resulting in a strip of film 11 (Figs. 3 and 4) bounded by plane surfaces 12 and 13 containing alternate opaque bands 14 which were overlain by transparent bands 6 in device 1 and alternate transparent bands 15 which were overlain by opaque bands 5 in device 1. The opaque bands 14 will be relatively sharp edged and since the film strip 11 was uniformly exposed to the light source for the optimum time the absolute widths of the opaque bands 14 and the transparent bands 15 will be identical. The actual dimensions of these bands will be as hereinabove stated in relation to device 1.

In the practice of the method of my invention with device 11 this device will be placed over a strip of the photographic paper for which the printing time is to be determined and progressively exposed to some predetermined light source starting for example at end 16 of device 11 and terminating the exposure immediately end 17 has been uncovered so that the end 16 will have been exposed for the full exposure time while the end 17 will have been exposed only for an infinitesimal time.

This may be accomplished very simply by laying a light shield over surface 12 of device 11 which in turn overlays the photographic paper and manually retracting this shield from end 16 toward the end 17. This method does not exactly predetermine the times at which the individual portions of the device 11 will have been exposed and for this reason I have devised an apparatus in which the device 11 overlaying the photographic paper may be progressively exposed to the light source at a uniform and predetermined rate so that the actual duration of the exposure for any specific part may be found by determining the length of any particular part from the end which was first exposed and multiplying this by a suitable factor.

Figure 5:
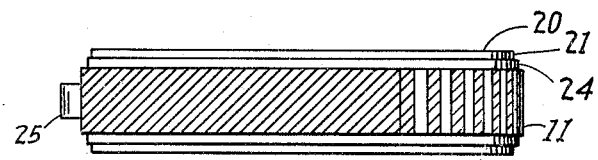
Fig. 5 is a top view of one element of one embodiment of the apparatus of my invention.
Figure 6:
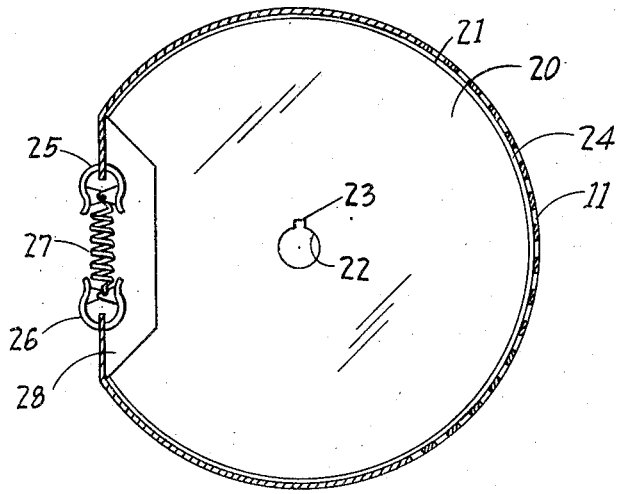
Fig. 6 is a side view of the construction shown in Fig. 5.

One element of this apparatus is wheel 20 (Figs. 5 and 6). The peripheral surface 21 of wheel 20 is concentric with bore 22 for mounting on a suitable shaft. Bore 22 carries keyway 23 by which it may be splined to the shaft. Immediately overlaying the surface 21 is the strip of photographic paper 24 and this is in turn overlaid by the device 11, the ends of which are engaged and drawn together by clamps 25 and 26 connected by spring 27. The clamps and spring are recessed in the cutout portion 28 of wheel 20. By thus drawing the ends of device 11 together device 11 snugly overlays the photographic paper 24 and holds it firmly in position. The assembling of the device and paper is of course carried out with the complete exclusion of all light which would affect the paper.

The wheel carrying the device and paper is then inserted in housing 30 (Fig. 9) (provided with central shaft 31 and spline 32) in such a position that the banded area of device 11 is completely covered and shielded by inner surface 33 of housing 30 as shown by rear view of wheel 20 in fragmental outline (Fig. 10). When the wheel has been thus inserted in housing 30 cover 40 is applied to face 41 of housing 30, the relative position of the cover in relation to the housing being fixed by the four holes 42 (Fig. 7) which register with the four dowels 43 (Fig. 9) carried in face 41 of the housing. The cover is then firmly secured in position by means of spring clips such as 44 (Fig. 8) carried by rod 45 pivotally connected to housing 30 by pin 46 and yieldingly urged in the direction indicated by arrow 47 by spring 48 which abuts against washer 49 carried at one end of rod 45. With the cover removed, clip 44 is in the position shown in Fig. 9 and after the cover has been applied the clip is drawn manually in the direction indicated by arrow 50 against the pressure of spring 48 (Fig. 9) whereupon the clip is turned to the positions indicated in Figs. 7 and 8 and released, thereby securing the cover 40 firmly in position.

As shown in Figs. 11 and 12, the complete form of the device includes base 51 carrying motor 52 (preferably synchronous) operating through reduction gear 53 to drive shaft 54 terminating in clutch half-portion 55.

As shown in Figs. 8 and 12 shaft 31 is pinned or similarly secured to worm gear 56 which in turn is driven by worm 57 carried by shaft 58 terminating in clutch half-portion 59. For convenience in loading, housing 30 is not rigidly secured to base 51 but merely rests thereon in a position predetermined by dowels 60 and 61 (Fig. 11) which are firmly anchored in base 51 and enter holes in foot 39 of housing 30.

After the device has been loaded in the manner just described it is brought into the same spatial relationship to the light source in which the actual printing operations are to be conducted and the motor 52 is set in operation. The time of the test is determined by means of a stop watch or similar device which is set in operation the instant the leading end of the banded area of device 11 appears at edge 62 of space 63 in housing 30 and is stopped in operation as soon as the time of the test has expired and in any event not later than the leading end of device 11 approaches the edge 64 of space 63. The light source is simultaneously cut off. In the preferred method of operating the device the leading end of the banded area is at the edge 62 of space 63 while the light source and the motor 52 are in a single circuit so that both go into operation simultaneously whenever the circuit is completed and both are stopped simultaneously as soon as the full time of the test has been reached. Following this, the housing 30 is removed from the base 51 and the cover 40 is removed, whereupon the wheel 20 is lifted out of housing 30 and device 11 is removed from the wheel 20 by loosening the spring clamps 25 and 26 (Fig. 6). These operations are of course conducted in the absence of any light which would affect the sensitive paper 24, and the paper is then immediately developed and fixed. It is then examined under a microscope to ascertain the exact point in the length of the paper at which the dark (exposed) and the light (unexposed) bands are identical in width, whereupon by measuring the exact distance of this point from the leading edge of the banded area in the paper and multiplying this length by a suitable factor the exact time at which this point was exposed in the test is determined. This is the optimum time for use in the actual printing operations. Here again if it is not possible to bring the device into the identical spatial relationship to the light source in which the actual printing operations are to be conducted it is possible by running a preliminary test with a sensitive paper for which the optimum printing time has already been determined to obtain a factor by which the optimum time as found in the test may be multiplied to ascertain the optimum time for printing under the light conditions which obtain in the printing operations.

The utility of my invention is not limited to printing operations, however, but may be applied to a variety of similar operations such as, for example, reversing and again reversing a first film to obtain a duplicate original of the first film, and to operations in which a negative is projected for the purpose of enlarging or reducing the same.

The foregoing description is for purposes of illustration and not of limitation and it is therefore my intention that the invention be limited only by the appended claims or their equivalents wherein I have endeavored to claim broadly all inherent novelty.

I claim:

1. Apparatus for determining exposure times comprising a sheet of transparent material having flush with the surface thereof sharp edged parallel lines opaque to light of equal width and of not exceeding ⅛ of an inch in width and spaced apart distances equal to said width, means for holding said sheet of transparent material with its banded surface overlaying and in contact with a sheet of material having a light sensitive surface, light excluding means covering said material carrying said light sensitive surface and said sheet of transparent material overlaying the same, and mechanical means for progressively withdrawing said sheet of transparent material and said material carrying said light sensitive surface from said light excluding means at a predetermined rate.

2. Apparatus in accordance with claim 1 in which said lines are of not exceeding 1/64 of an inch in width.

3. Method of determining exposure times which comprises variably exposing different areas of a specimen of a light sensitive surface to multiple bands of light of equal width not exceeding ⅛ of an inch and spaced apart by bands of equal width from which light has been excluded, thereafter developing the light sensitive surface and determining the width of the bands thereon resulting from said light excluded bands in relation to the width of the latter whereby that part of the said light sensitive surface in which the width of the non-exposed band is identical in width with said light excluded band will indicate the optimum exposure time.

4. Method according to claim 3 in which there is determined the relative width of the resulting light and dark bands on the developed sensitive surface whereby that part of said light sensitive surface in which the width of the light and dark bands is identical would indicate the optimum exposure time.

5. Method in accordance with claim 4 in which said bands of light are not exceeding 1/64 of an inch in width.

6. Device for determining exposure times consisting of a sheet of transparent material and on one side of said sheet, flush with the surface thereof, sharp edged parallel lines opaque to light of equal width and of not exceeding ⅛ of an inch in width, each of said lines being separated from the adjacent line by a space identical with that of the line, means for holding a sheet of material having a light-sensitive surface in photo-printing contact with said sheet of transparent material on said side, and means for variably exposing such light-sensitive sheet in fixed relation to said transparent sheet.

7. Device in accordance with claim 6 in which said lines are of not exceeding 1/64 of an inch in width.

WILLIAM C. SEIFERT.

REFERENCES CITED

The following references are of record in the file of this patent:

UNITED STATES PATENTS

| Number | Name | Date |
|---|---|---|
| 1,387,318 | Schulz | Aug. 9, 1921 |
| 1,605,062 | Powrie | Nov. 2, 1926 |
| 1,938,085 | Page | Dec. 5, 1933 |
| 2,190,553 | Tarr | Feb. 13, 1940 |
| 2,212,834 | Ralish | Aug. 27, 1940 |
| 2,268,436 | Ash | Dec. 30, 1941 |
| 2,306,869 | Eckerlin | Dec. 29, 1942 |